United States Patent
Husar et al.

(10) Patent No.: US 10,631,134 B2
(45) Date of Patent: Apr. 21, 2020

(54) DISTRIBUTING DATA BETWEEN MOBILE SERVICES

(71) Applicant: Red Hat, Inc., Raleigh, NC (US)

(72) Inventors: Radoslav Husar, Brno (CZ); Jiri Sedlacek, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 694 days.

(21) Appl. No.: 13/688,356

(22) Filed: Nov. 29, 2012

(65) Prior Publication Data
US 2014/0148091 A1 May 29, 2014

(51) Int. Cl.
*H04W 4/06* (2009.01)
*H04W 4/08* (2009.01)
(Continued)

(52) U.S. Cl.
CPC ........... *H04W 4/06* (2013.01); *H04L 67/1065* (2013.01); *H04L 67/1095* (2013.01); *H04W 4/08* (2013.01); *H04L 67/06* (2013.01); *H04W 4/80* (2018.02)

(58) Field of Classification Search
CPC ......... H04W 4/023; H04W 4/02; H04W 4/06; H04W 4/08; H04W 4/20; H04W 8/186; H04W 16/24; H04W 84/18; H04W 4/008; H04W 4/021; H04W 4/206; H04W 4/22; H04W 4/80; H04W 76/002; H04W 76/007; H04W 76/021; H04W 28/0268; H04W 28/18; H04W 48/16; H04L 29/06027; H04L 29/06; H04L 41/0806; H04L 65/605; H04L 67/04; H04L 67/104; H04L 67/1063; H04L 67/1065; H04L 67/18; H04L 67/34; H04L 67/38; H04L 12/00; H04L 29/027; H04L 63/0428; H04L 67/02; H04L 67/06; H04L 67/105; H04L 67/108; H04L 67/1095; H04L 67/14; H04L 67/22; H04L 67/306; H04L 69/28; H04L 69/329; G06F 3/016; G06F 3/017; G06F 3/0486; G06F 17/30707; G06F 17/30867; G06F 21/10; G06F 17/30165; G06F 17/30174; G06F 17/30206; G06F 17/30212; G06F 17/30268; G06F 17/30525; G06F 17/30528; G06F 17/30575; G06F 17/3089; G06F 17/30; G09B 5/06;
(Continued)

(56) References Cited

U.S. PATENT DOCUMENTS 6,466,951 B1 * 10/2002 Birkler ............... G06F 17/30575
6,549,917 B1 * 4/2003 Pollard ..................... H04L 67/06
(Continued)

*Primary Examiner* — Yuwen Pan
*Assistant Examiner* — Paul P Tran
(74) *Attorney, Agent, or Firm* — Lowenstein Sandler LLP

(57) ABSTRACT

A mechanism for distributing data between mobile devices. A method includes creating, by a processing device, a group comprising of mobile devices in an ad-hoc mode that share data. The mobile devices are located within a pre-defined range. The method also includes identifying, by the processing device, at least a portion of the data available for sharing in at least one of the mobile devices. The method also includes replicating, by the processing device, the identified data for distribution to the mobile devices. The method further includes distributing, by the processing device, the replicated data to the at least one of the mobile devices in the immediate mode when the at least one of the mobile devices is within the pre-defined range.

17 Claims, 4 Drawing Sheets

(51) Int. Cl.
*H04L 29/08* (2006.01)
*H04W 4/80* (2018.01)

(58) Field of Classification Search
CPC ............. G06Q 20/3674; G06Q 10/107; G06Q 30/0201; G06Q 10/1095; G08B 21/0236; G08B 21/0277; G08B 21/0288; H04Q 9/00
USPC ....... 370/230, 254, 256, 328, 338; 455/3.01, 455/41.1, 41.2, 518, 519; 707/661; 709/200, 204, 206; 725/80
See application file for complete search history.

(56) References Cited

U.S. PATENT DOCUMENTS

| | | | |
|---|---|---|---|
| 6,735,448 B1 * | 5/2004 | Krishnamurthy | H04W 52/343 455/522 |
| 2002/0104011 A1 * | 8/2002 | Svoboda | H04L 29/06 726/26 |
| 2003/0200177 A1 * | 10/2003 | Kugai | G06F 21/10 705/51 |
| 2005/0086384 A1 * | 4/2005 | Ernst | G06F 17/30 709/248 |
| 2005/0097169 A1 * | 5/2005 | Mukherjee et al. | 709/204 |
| 2005/0136884 A1 * | 6/2005 | Reidelsturz | H04H 20/57 455/403 |
| 2005/0165795 A1 * | 7/2005 | Myka | G06Q 10/1095 |
| 2005/0273399 A1 * | 12/2005 | Soma | G06F 21/10 707/758 |
| 2006/0066455 A1 * | 3/2006 | Hancock | H04Q 9/00 340/870.01 |
| 2006/0115084 A1 * | 6/2006 | Ryu | H04H 60/16 380/247 |
| 2006/0146765 A1 * | 7/2006 | Van De Sluis et al. | 370/338 |
| 2007/0067443 A1 * | 3/2007 | Seligmann | H04L 67/104 709/224 |
| 2007/0087682 A1 * | 4/2007 | DaCosta | 455/3.01 |
| 2007/0274241 A1 * | 11/2007 | Brothers | 370/310 |
| 2008/0080392 A1 * | 4/2008 | Walsh | H04L 29/12113 370/254 |
| 2008/0208976 A1 * | 8/2008 | Chapalamadugu | H04L 67/104 709/205 |
| 2010/0036909 A1 * | 2/2010 | Lee et al. | 709/203 |
| 2010/0062710 A1 * | 3/2010 | Graff | G08B 21/0236 455/41.2 |
| 2012/0197988 A1 * | 8/2012 | Leppanen | G06Q 50/01 709/204 |
| 2012/0243408 A1 * | 9/2012 | Leppanen | H04W 40/246 370/230 |
| 2013/0018899 A1 * | 1/2013 | Hargreaves | G06Q 30/0201 707/754 |
| 2013/0041889 A1 * | 2/2013 | Gotoh | H04L 67/02 707/722 |
| 2014/0068023 A1 * | 3/2014 | Arickan | H04L 61/2015 709/220 |
| 2014/0185499 A1 * | 7/2014 | Ray | H04W 84/18 370/310 |

* cited by examiner

DISTRIBUTING DATA BETWEEN MOBILE SERVICES

TECHNICAL FIELD

The embodiments of the disclosure relate generally to a computer system and, more specifically, relate to mechanism for distributing data between mobile devices.

BACKGROUND

Currently, many applications exist that provide for distribution of data between mobile devices. The mobile devices may include a variety of different computing devices such as, for example, smart phones, mobile phones, tablet device, personal digital assistants (PDAs), personal navigation devices, portable computers, personal computers (PCs), palm-sized computing devices, etc. Many advances have been made to provide more storage space in the mobile device to store data received at the mobile device.

Most of the applications currently available to distribute data require a centerpiece available wirelessly (typically a server) between the mobile devices. However, the wireless central access point generally utilizes a large amount of mobile broadband bandwidth. Furthermore, many applications are dependent on an internet connection to distribute data between the mobile devices. As a result, such applications are often not reliable due to location and other connectivity issues of the mobile devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Embodiments of the disclosure provide a mechanism for distributing data between mobile devices. According to one embodiment of the disclosure, a method for distributing data between the mobile devices includes creating, by a processing device, a group comprising of mobile devices in an ad-hoc mode that share data. The mobile devices are located within a pre-defined (hardware limited) range. The method also includes identifying, by the processing device, at least a portion of the data available for sharing in at least one of the mobile devices. The method also includes replicating, by the processing device, the identified data for distribution to the mobile devices. The method further includes distributing, by the processing device, the replicated data to the at least one of the mobile devices in an immediate mode when the at least one of the mobile devices is within the pre-defined range.

In some embodiments, the replicated data is temporarily stored when at least one of the mobile devices in the sharing group is outside the pre-defined range at a time of the distributing of the replicated data. In other embodiments, the stored replicated data is retransmitted to the at least one of the mobile devices in a send-later mode when the at least one of the mobile devices outside the pre-defined range returns back into the pre-defined range. As such, all the mobile devices in the sharing group are tracked and replicated data is transmitted to all the mobile devices 102 in the sharing group.

In alternate embodiments, criteria are established for the data for synchronization of the data. In one alternate embodiment, the replicated data is distributed based on the criteria. In other alternate embodiment, the stored replicated data is retransmitted based on the criteria.

Embodiments of the disclosure also provide a data distribution processing module initialized on a computer system. In one embodiment, the data distribution processing module creates a group of mobile devices in an ad-hoc mode that share the data. The data distribution processing module also identifies at least a portion of the data available for sharing in the mobile devices. The data distribution processing module further replicates the identified data for distribution to the mobile devices and distributes the replicated data to the mobile devices in the immediate mode when the mobile devices are within the pre-defined range.

Figure 1:
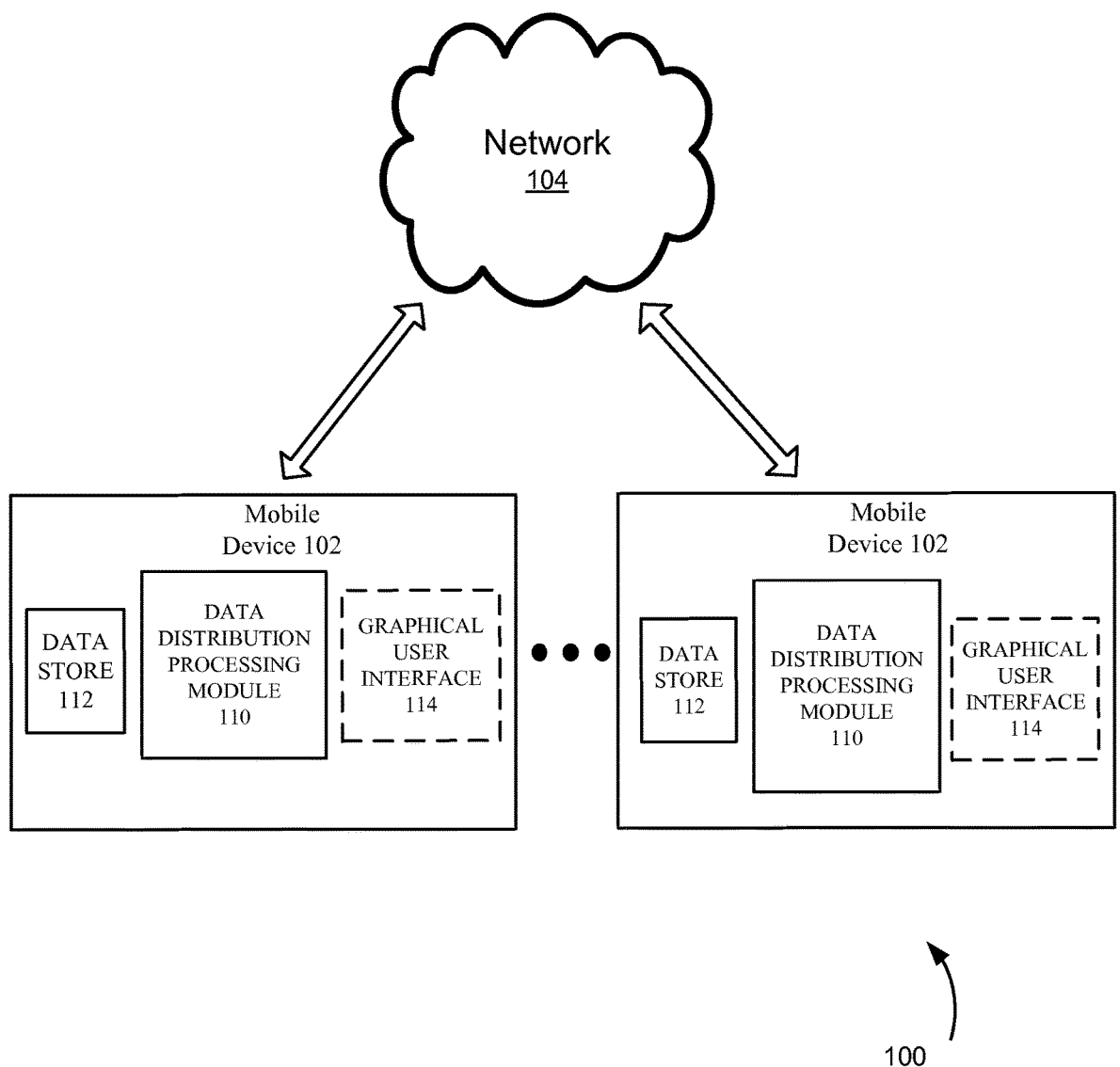
FIG. 1 is a block diagram of a computer system in which the embodiments of the disclosure may operate.

FIG. 1 illustrates an example of a network architecture 100 in which embodiments of the disclosure may operate. The network architecture 100 may include mobile devices 102, and a network 104. The mobile devices 102 may be any of a variety of different computing devices such as, for example, smart phones, mobile phones, tablet device, personal digital assistants (PDAs), personal navigation devices, portable computers, personal computers (PCs), server computers, palm-sized computing devices, etc. In one embodiment, the mobile devices 102 are portable from one location to another. The mobile devices 102 are communicably coupled to each other via the network 104. Network 104 may be a private network (e.g., Ethernet or a local area Network (LAN)), wide area network (WAN) or a public network (e.g., Internet). In one embodiment, the network is a Wi-Fi network. In another embodiment, the network is a Bluetooth network. The system may include any number of mobile devices 102 that communicate with each other over the network 104.

The mobile device 102 may host a data distribution processing module 110, a data store 112 and a graphical user interface (GUI) 114. The data distribution processing module 110 functions to distribute data between the mobile devices 102. Users of the mobile devices 102 may interact with each other by exchanging messages via standard protocols, such as, but not limited to, File Transfer Protocol (FTP) and Hypertext Transfer Protocol (HTTP). Each mobile device 102 may run mobile applications (not shown) to either generate or capture data that is identified by the data distribution processing module 110 deployed on the mobile devices 102. Furthermore, each mobile device 102 may run mobile applications to receive data distributed by the data distribution processing module 110 deployed on the mobile devices 102. Data, as discussed herein, may be any type of information generated or captured by the mobile device 102. Some examples of data include, but are not limited to, text, image, audio, video, and so on.

In some embodiments, the data distribution processing module 110 sends a request to users of the mobile devices 102 based on their locations. The location is a position of the mobile device 102 within a pre-defined range. In one embodiment, the range may be based on the hardware limitations of transmission technology. In one example, for the Bluetooth technology, the range may be in several meters. In another example, for the Wi-Fi technology, the range may be in tens of meters. In another embodiment, the range may be based on transmitting power of the mobile device 102. The mobile devices 102 may include a global positioning system (GPS) (not shown) or another similar application to provide the location of the mobile device. In one embodiment, the request includes asking the users of the mobile device if they chose to be a member of a group ("sharing group") that shares the data of the mobile devices 102.

In some embodiments, the data distribution processing module 110 creates a sharing group for the mobile devices 102 that provided a confirmation to join the sharing group as a member. In one embodiment, the data distribution processing module 110 creates the sharing group in an ad-hoc mode, such that the mobile devices 102 of the sharing group share the data in the ad-hoc mode. Ad-hoc mode refers to communication over an ad-hoc network where mobile devices within a predetermined range directly communicate with each other without using any wireless central access points. A wireless access point is a device that allows wireless devices to connect to a wired network using Wireless Fidelity (Wi-Fi), or related standards.

In one embodiment, the ad-hoc mode is established by setting up the network 104 in the ad-hoc mode such that first two members of the two mobile devices 102 establish communication with each other to form current group members which is followed by third and every other new member of the mobile device 102 communicating with one of the current group members and thus establish group membership.

In another embodiment, the data processing distribution module 110 creates the sharing group such that the mobile devices 102 of the sharing group share the data in the immediate mode. The immediate mode refers to communication between mobile devices 102 when the mobile devices are connected ad-hoc to each other over the network 104. When mobile devices 102 continue to communicate via the immediate mode, the users of the mobile devices 102 may transparently access the data that is available when the mobile devices 102 are connected ad-hoc to each other over the network 104.

In some embodiments, the data processing distribution module 110 identifies at least a portion of the data available in one or more of the mobile devices 102 for sharing among the mobile devices 102 of the sharing group. In one embodiment, the data is captured by the mobile device 102 of the sharing group. In another embodiment, the data is generated within the mobile device 102 of the sharing group. In other embodiments, the data is distributed immediately to the members of the sharing group after it is either captured or generated by one of the mobile devices 102. In one embodiment, each member of the sharing group stores information in the data store 112 on the at least portion of the data available for sharing. In other embodiment, each member of the sharing group stores information in the data store 112 regarding which sharing group received which portion of the data. As discussed above, data may be any type of information either generated or captured by the mobile device 102. Some examples of data include, but are not limited to, text, image, audio, video, and so on.

In some embodiments, the data distribution processing module 110 automatically replicates the identified data for distribution to all the mobile devices 102 of the sharing group. In one embodiment, the data distribution processing module 110 automatically distributes the replicated data to the mobile devices 102 in the immediate mode when the mobile devices are within the pre-defined range. As discussed above, the immediate mode refers to communication between mobile devices 102 when the mobile devices are connected ad-hoc to each other over the network 104. In one embodiment, the data distribution processing module 110 shares the data without any interaction from the user of the mobile device 102. Some examples of the user interaction include, but are not limited to, user sending the data for distribution, user asking or requesting for the data for distribution, user retrieving the data, user establishing a group in an initial stage, user leaving the group. As such, there may be no user interaction for automatic distribution of data.

In other embodiments, one or more mobile devices 102 in the sharing may be temporarily outside a pre-defined range at the time of the distribution of the data. In such embodiment, the replicated data may not be immediately distributed to the mobile device 102. The data distribution processing module 110 temporarily stores the replicated data in the data store 112. The data distribution processing module 110 automatically retransmits the stored replicated data to the one or more mobile devices 102 in a send-later mode immediately after the one or more mobile devices 102 arrive inside the pre-defined range. The send-later mode refers to communication between mobile devices 102 that were initially (at the time of distribution of the replicated data) not in the pre-defined range but later arrive in the pre-defined range to be re-connected ad-hoc to each other over the network 104. As such, the data distribution processing module 110 tracks all the mobile devices 102 in the sharing group and confirms that replicated data is transmitted to all the mobile devices 102 in the sharing group.

In one embodiment, similar to the scenario of the immediate mode, in the send-later mode, the user of the mobile device need not interact with the data distribution processing module 110 in order to share the data without any interaction from the user of the mobile device 102. Some examples of the user interaction include, but are not limited to, user sending the data for distribution, user asking or requesting for the data for distribution, user retrieving the data, user establishing a group in an initial stage, user leaving the group. As such, there may be no user interaction for automatic distribution of data.

In yet other embodiments, the data distribution processing module 110 establishes criteria for the data. In one embodiments, the criteria is established for all the data eligible for sharing. In another embodiment, the criteria are established in order to synchronize the data between the mobile devices. Some examples of the criteria include, but are not limited to, data type, file type, time of data capture/creation, and time window for syncing the group. In some embodiments, the criteria are provided by the users of the mobile devices 102 of the sharing group. The data distribution processing module 110 may automatically distribute the replicated data to the mobile devices 102 in the immediate mode based on the criteria. In another embodiment, the data distribution processing module 110 automatically retransmits the stored replicated data to the mobile devices 102 in the send-later mode based on the criteria.

In some embodiments, the data is shared among the mobile devices 102 using a wireless technology, such as wireless fidelity (Wi-Fi), near filed communications (NFC), Bluetooth, Home radio frequency (Home RF), to name a few examples. In another embodiment, the data is shared using a standard encryption mechanism for security. Some examples of the standard encryption mechanism include, but are not limited to, asymmetrical cryptography, symmetrical cryptography, etc.

In some embodiments, the data may be displayed using a graphical user interface (GUI) 114 of the mobile device 102.

Figure 2:
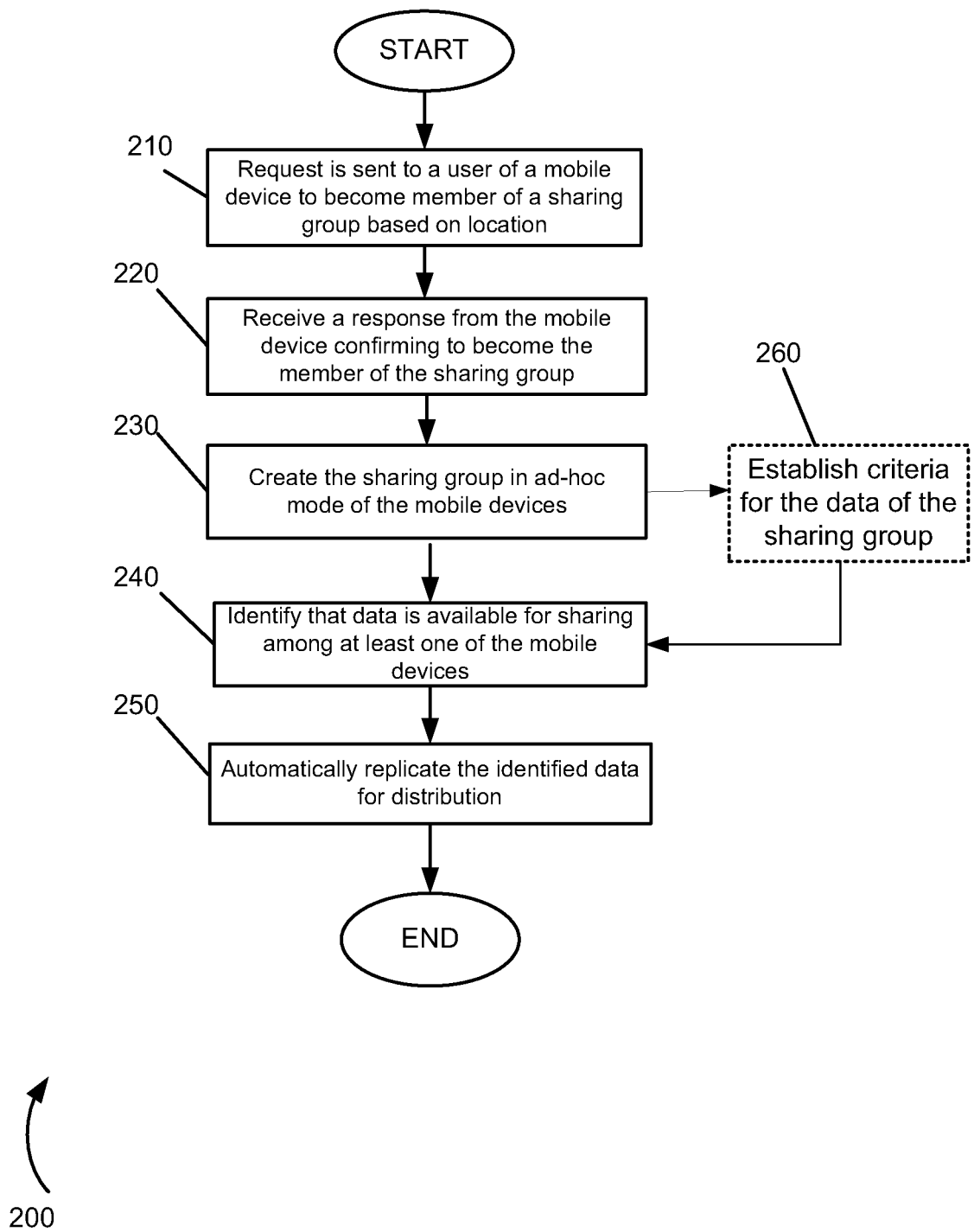
FIG. 2 is a flow diagram of an embodiment of a method for distributing data between mobile devices.

FIG. 2 is a flow diagram illustrating a method 200 for distributing data between mobile devices according to an embodiment of the disclosure. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by the data processing distribution module 110 of the mobile device 102 of FIG. 1.

Method 200 begins at block 210 where a request is sent by a data distribution processing module 110 of a mobile device 102. The request may be sent to users of mobile devices 102 based on locations of the mobile devices 102. As discussed above, the location is a position of the mobile device 102 within a pre-defined range. In one embodiment, the request includes an inquiry to the users of the mobile devices 102 of whether the users chose to be a member of a group ("sharing group"). At block 220, the data distribution processing module 110 receives responses from the mobile devices 102 that are confirming their membership in the sharing group.

At block 230, the data distribution processing module 110 creates the sharing group in an ad-hoc mode of the mobile devices 102 that confirmed to be the members of the sharing group. Ad-hoc mode refers to communication over an ad-hoc network where mobile devices within a predetermined range directly communicate with each other without using any wireless central access points. A wireless access point is a device that allows wireless devices to connect to a wired network using Wireless Fidelity (Wi-Fi), or related standards.

At block 240, the data distribution processing module 110 identifies at least a portion of the data available in one or more of the mobile devices 102 for sharing among at least one of the mobile devices 102 of the sharing group. In one embodiment, the data is captured by the mobile device 102 of the sharing group. In another embodiment, the data is generated within the mobile device 102 of the sharing group. As discussed above, data may be any type of information composed and transmitted by the mobile device 102 and received by the mobile device 102. Some examples of data include, but are not limited to, text, image, audio, video, and so on.

At block 250, the data distribution processing module 110 automatically replicates the identified data for distribution to at least one of the mobile devices 102 of the sharing group in the immediate mode. As discussed above, immediate mode is a method for the mobile devices 102 to share the data among each other even when the mobile devices 102 are ad-hoc connected to each other over the network.

In one optional embodiment, at block 260, the data distribution processing module 110 establishes criteria for the data of the sharing group. In one embodiment, the criteria are established to synchronize the data between the mobile devices. Some examples of the criteria include, but are not limited to, data type, file type, time of data capture/creation, and time window for syncing the group and so on. Once the criteria are established, blocks 240 and 250 are repeated.

Figure 3:
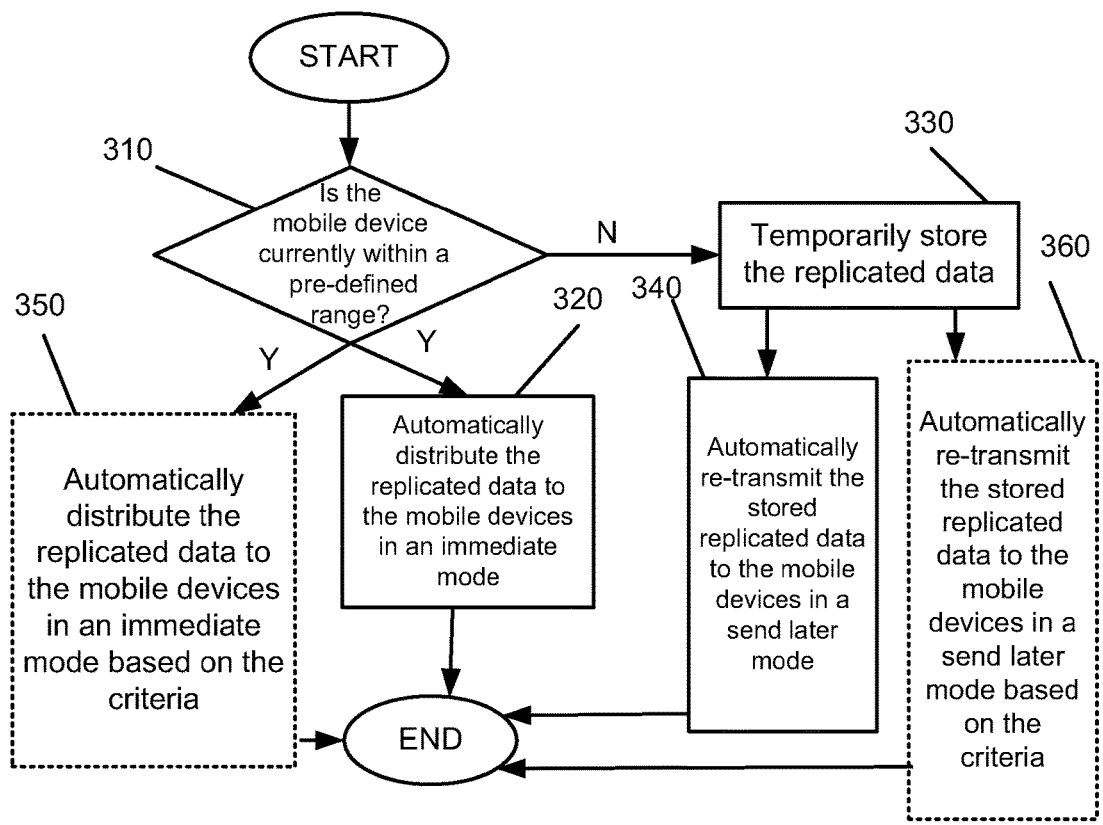
FIG. 3 is a flow diagram of an embodiment of a method for distributing data between mobile devices.

FIG. 3 is a flow diagram illustrating a method 300 for distributing data between mobile devices according to an embodiment of the disclosure. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by the data processing distribution module 110 of the mobile device 102 of FIG. 1.

Method 300 begins at a decision block 310, where the data distribution processing module 110 determines if the mobile devices 102 are currently within the pre-defined range. If a mobile device in the sharing group is determined to be within the pre-defined range at decision block 310, then method 300 continues to block 320 where the data distribution processing module 110 automatically distributes the replicated data to the other mobile devices 102 of the sharing group in the immediate mode. In one embodiment, the data distribution processing module 110 shares the data without any interaction from the user of the mobile device 102. Some examples of the user interaction include, but are not limited to, user sending the data for distribution, user asking or requesting for the data for distribution, user retrieving the data, user establishing a group in an initial stage, user leaving the group. As such, there may be no user interaction for automatic distribution of data.

On the other hand, if a mobile device in the sharing group is not within the pre-defined range at decision block 310, then method 300 proceeds to block 330 where the data distribution processing module 110 temporarily stores the replicated data in a data store 112 of the mobile device 102. Then, at block 340, the data distribution processing module 110 automatically re-transmits the stored data to the mobile devices 102 in the send-later mode when the mobile devices 102 return back into the pre-defined range. As discussed above, the send-later mode refers to communication between mobile devices 102 that were initially (at the time of distribution of the replicated data) not in the pre-defined range but later arrive in the pre-defined range to be re-connected ad-hoc to each other over the network 104. As such, the data distribution processing module 110 tracks all the mobile devices 102 in the sharing group and confirms that replicated data is transmitted to all the mobile devices 102 in the sharing group.

As discussed above, in one embodiment, the data distribution processing module 110 shares the data without any interaction from the user of the mobile device 102. Some examples of the user interaction include, but are not limited to, user sending the data for distribution, user asking or requesting for the data for distribution, user retrieving the data, user establishing a group in an initial stage, user leaving the group. As such, there may be no user interaction for automatic distribution of data.

In the alternate embodiment, at block 350, the data distribution processing module 110 automatically distributes the replicated data to the mobile devices 102 in the immediate mode based on criteria when at block 310 it is determined that the mobile devices are currently within the pre-defined range. As discussed above, the data distribution module 110 establishes criteria for the data of the sharing group. In one embodiment, the criteria are established to synchronize the data between the mobile devices. Some examples of the criteria include, but are not limited to, data type, file type, time of data capture/creation, and time window for syncing the group and so on. Then, block 330 is repeated. In another alternate embodiment, at block 360, the data distribution processing module 110 automatically re-transmits the stored data to the mobile devices 102 in the send-later mode based on the criteria when the mobile devices 102 return back into the pre-defined range.

Figure 4:
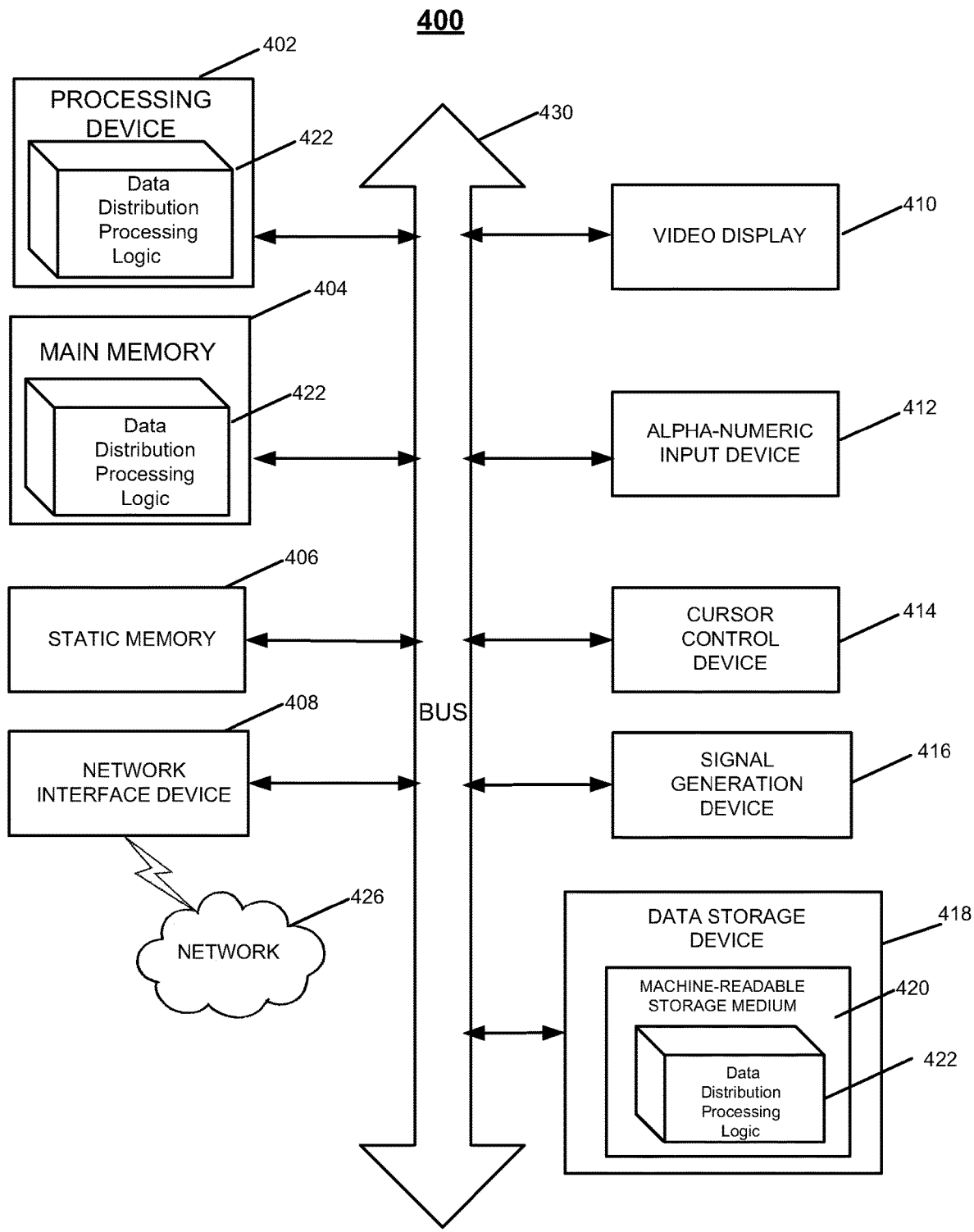
FIG. 4 illustrates a block diagram of one embodiment of a computer system.

FIG. 4 illustrates a diagrammatic representation of a machine in the example form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute data distribution processing logic 422 for performing the operations and steps discussed herein. In one embodiment, data distribution processing module 110 described with respect to FIG. 1 performs the data distribution processing logic 422.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium (or more specifically a computer-readable storage medium) 420 on which is stored one or more sets of instructions (e.g. data distribution processing module logic 422) embodying any one or more of the methodologies of functions described herein, such as methods 200 and 300 for distributing data between mobile devices described with respect to FIG. 1. The data distribution processing module logic 422 may also reside, completely or at least partially, within the memory 406 and/or within the processing device 402 during execution thereof by the computer system 400; the memory 406 and the processing device 402 also constituting machine-accessible storage media.

The machine-readable storage medium 420 may also be used to store the data distribution processing module logic 422 persistently containing methods that call the above applications. While the machine-readable storage medium 420 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It should be apparent, however, that the disclosure may be practiced without these specific details. In some instances, structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those well-known in the data processing arts to most effectively convey the substance of their work to others well-known in the art. An algorithm is here, and generally, conceived to be a self-consistent sequence of steps leading to a desired result. The steps are those requiring physical manipulations of physical quantities. Usually, though not typically, these quantities take the form of electrical or magnetic signals capable of being stored, transferred, combined, compared, and otherwise manipulated. It has proven convenient at times, typically for reasons of common usage, to refer to these signals as bits, values, elements, symbols, characters, terms, numbers, or the like.

It should be borne in mind, however that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "receiving", "sending", "generating", "storing", "predicting" "determining" or the like, refer to the action and processes of a computer system, or similar electronic computing device that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be constructed for the specific purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct an apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

It is to be understood that the above description is intended to be illustrative, and not restrictive. Many other embodiments will be apparent to those well-known in the art upon reading and understanding the above description. Although the disclosure has been described with reference to specific examples of embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A method, comprising:
   identifying, by a processing device of a mobile device, a group of mobile devices that share data in response to receiving a confirmation from the mobile devices to become a member of the group, wherein the mobile devices are located within a defined range that is in view of a power characteristic of the mobile device;
   identifying, by the processing device, at least a portion of the data available for sharing in at least one of the mobile devices of the group;
   receiving, from one or more mobile devices of the group of mobile devices that has provided the confirmation to become a member of the group, information specifying a criteria for distributing data to the group of mobile devices;
   identifying a time when the portion of the data available for sharing was created;
   replicating, by the processing device, the identified data to distribute to the group of mobile devices;
   distributing, by the processing device of the mobile device, the replicated data to the mobile devices of the group that are within the defined range in response to the time when the portion of the data was created satisfying the criteria for distributing data to the group of mobile devices;
   determining whether the replicated data has not been distributed to at least one of the mobile devices of the group that was outside of the defined range when the replicated data is distributed;
   encrypting the replicated data by using an encryption operation to generate encrypted replicated data, wherein the encryption operation is associated with symmetrical cryptography; and
   in response to determining that the replicated data has not been distributed to the at least one of the mobile devices that was outside of the defined range, distributing, by the processing device and to the at least one of the mobile devices, the encrypted replicated data when the at least one of the mobile devices returns within the defined range.

2. The method of claim 1, further comprising establishing, by the processing device, the criteria for the data, wherein the criteria further comprises at least one of a data type, a file type, a time of capture of the data, or a time window for synchronizing the group.

3. The method of claim 2, further comprising temporarily storing, by the processing device, the replicated data when the at least one of the mobile devices is outside the defined range at a time of the distributing of the replicated data, wherein the defined range is a specific distance.

4. The method of claim 3, further comprising retransmitting, by the processing device, the stored replicated data to the at least one of the mobile devices in a send-later mode when the at least one of the mobile devices outside the defined range returns back into the defined range.

5. The method of claim 4, wherein the stored replicated data is retransmitted in view of the criteria.

6. The method of claim 1, further comprising sending, by the processing device, a request to the mobile devices of the group that are located within the defined range to become member of the group.

7. The method of claim 6, further comprising receiving a response from the mobile devices located within the defined range, the response comprising a confirmation to be a member of the group.

8. A system comprising:
   a memory; and
   a processing device of a mobile device, operatively coupled with the memory, to:
   identify a group of mobile devices that share data in response to receiving a confirmation from the mobile devices to become a member of the group,
   wherein the mobile devices are located within a defined range that is in view of a power characteristic of the mobile device;
   identify at least a portion of the data available for sharing in at least one of the mobile devices of the group;
   receive, from one or more mobile devices of the group of mobile devices that has provided the confirmation to become a member of the group, information specifying a criteria for distributing data to the group of mobile devices;
   identify a time when the portion of the data available for sharing was created;
   replicate the identified data to distribute to the group of mobile devices;
   distribute, by the processing device of the mobile device, the replicated data to the mobile devices of the group that are within the defined range in response to the time when the portion of the data was created satisfying the criteria for distributing data to the group of mobile devices;

determine whether the replicated data has not been distributed to at least one of the mobile devices of the group that was outside of the defined range when the replicated data is distributed;

encrypt the replicated data by using an encryption operation to generate encrypted replicated data, wherein the encryption operation is associated with symmetrical cryptography; and in response to determining that the replicated data has not been distributed to the at least one of the mobile devices that was outside of the defined range, distribute, to the at least one of the mobile devices, the encrypted replicated data when the at least one of the mobile devices returns within the defined range.

9. The system of claim 8 wherein the processing device is to establish the criteria for the data wherein the criteria comprises at least one of a data type, a file type, a time of capture of the data, or a time window for synchronizing the group.

10. The system of claim 9, wherein the processing device is to temporarily store the replicated data when the at least one of the mobile devices is outside the defined range at a time of the distribution of the replicated data, wherein the defined range is a specific distance.

11. The system of claim 10, wherein the processing device is to retransmit the stored replicated data to the mobile devices in a send-later mode when the at least one of the mobile devices outside the defined range returns back into the defined range.

12. The system of claim 11, wherein the stored replicated data is re-transmitted in view of the criteria.

13. A non-transitory machine-readable storage medium comprising data that, when accessed by a processing device, cause the processing device to:

identify, by the processing device of a mobile device, a group of mobile devices that share data in response to receiving a confirmation from the mobile devices to become a member of the group, wherein the mobile devices are located within a defined range that is in view of a power characteristic of the mobile device;

identify, by the processing device, at least a portion of the data available for sharing in at least one of the mobile devices of the group;

receive, from one or more mobile devices of the group of mobile devices that has provided the confirmation to become a member of the group, information specifying a criteria for distributing data to the group of mobile devices;

identify a time when the portion of the data available for sharing was created;

replicate, by the processing device, the identified data to distribute to the group of mobile devices;

distribute, by the processing device of the mobile device, the replicated data to the mobile devices of the group that are within the defined range in response to the time when the portion of the data was created satisfying the criteria for distributing data to the group of mobile devices;

determine whether the replicated data has not been distributed to at least one of the mobile devices of the group that was outside of the defined range when the replicated data is distributed;

encrypt the replicated data by using an encryption operation to generate encrypted replicated data, wherein the encryption operation is associated with symmetrical cryptography; and in response to determining that the replicated data has not been distributed to the at least one of the mobile devices that was outside of the defined range, distribute, by the processing device and to the at least one of the mobile devices, the encrypted replicated data when the at least one of the mobile devices returns within the defined range.

14. The non-transitory machine-readable storage medium of claim 13, wherein the processing device is to establish the criteria for the data for synchronization of the data, wherein the criteria comprises at least one of a data type, a file type, a time of capture of the data, or a time window for synchronizing the group.

15. The non-transitory machine-readable storage medium of claim 14 wherein the processing device is to temporarily store the replicated data when at least one of the mobile devices is outside the defined range at a time of the distributing of the replicated data, wherein the defined range is a specific distance.

16. The non-transitory machine-readable storage medium of claim 15, wherein the processing device is to retransmit the stored replicated data to the at least one of mobile devices in a send-later mode when the at least one of the mobile devices outside the defined range returns back into the defined range.

17. The non-transitory machine-readable storage medium of claim 16, wherein the data is re-transmitted in view of the criteria.

* * * * *